Oct. 31, 1950 S. B. HELLSTROM 2,527,882
TAP RECONDITIONER
Filed June 24, 1946 2 Sheets-Sheet 1

INVENTOR.
Sven B. Hellstrom.
BY
Harness, Dickey & Pierce.
ATTORNEYS.

Oct. 31, 1950  S. B. HELLSTROM  2,527,882
TAP RECONDITIONER

Filed June 24, 1946  2 Sheets-Sheet 2

INVENTOR.
Sven B. Hellstrom.
BY
Harness Dickey & Pierce
ATTORNEYS.

Patented Oct. 31, 1950

2,527,882

UNITED STATES PATENT OFFICE 2,527,882

TAP RECONDITIONER

Sven B. Hellstrom, Grosse Pointe Park, Mich., assignor to Detroit Tap & Tool Company, Detroit, Mich., a corporation of Delaware Application June 24, 1946, Serial No. 678,856

5 Claims. (Cl. 51—92)

1

The present invention relates to a tap reconditioner, and generally constitutes an improvement over the mechanism for the same purpose disclosed in U. S. Patent 2,393,372 to Sven B. Hellstrom for a Tap Reconditioning Machine, and assigned to the assignee of the present invention.

After a tap has been used for a period of time, the cutting edges become dull and it is no longer possible to cut sharp threads with the same. For reasons of economy, it is customary to resharpen the cutting edges of a dull tap in a tap reconditioner. Inasmuch as it is not unusual for a manufacturer to use taps which may vary widely in size, number of flutes, angle of taper and degree of chamfer, it is desirable that a machine for this purpose be capable of reconditioning taps which vary in such respects. It is also desirable that a machine of this nature be simple in design and capable of being operated by semi-skilled or relatively unskilled labor to accurately and precisely recondition taps.

It is therefore a primary object of the present invention to provide a simple compact and yet at the same time precise and accurate machine capable of performing flute grinding and spiral pointing upon taps which may vary widely in size, number of flutes, angle of taper, and degree of chamfer.

Another object of the present invention is to provide appartus of the type mentioned which is extremely simple in design and construction and capable of being operated by semi-skilled or relatively unskilled labor to accurately and precisely recondition taps.

Still further, the invention contemplates the provision of apparatus which may be easily and conveniently adjusted to accommodate taps which are designed for either right-hand or left-hand threads.

Many other and further objects, advantages, and features of the present invention will become apparent from the following description, when considered in conjunction with the accompanying drawings, wherein like numbers indicate like parts wherever shown and wherein:

Figure 3 is a sectional elevation taken substantially on line 3—3 of Figure 2, illustrating the tap holding means.

Figure 1:
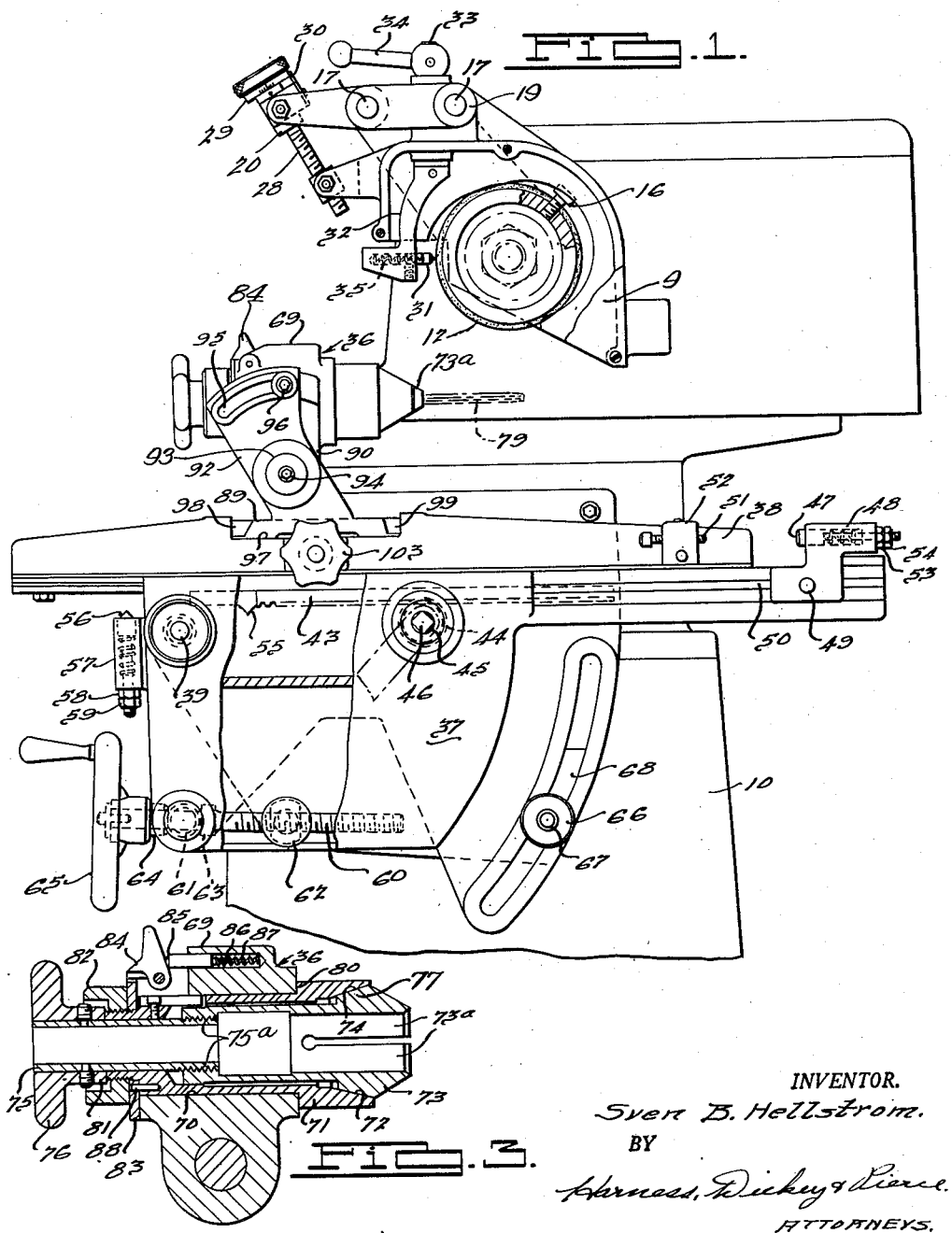
Figure 1 is an elevational view of the right side of a tap reconditioner embodying the improvements of the present invention and illustrating apparatus thereon for flute grinding and spiral pointing a tap.

With more particular reference to the drawings, it must be borne in mind that the drawings disclose but one single embodiment of the invention described and claimed herein and, while the construction shown is quite specific, many modifications thereof and departures therefrom may be made without departing from the generic spirit and scope of the invention as defined in the appended claims.

In the present case, there is provided a base 10 which is preferably formed from a single, integral hollow casting and which serves to provide a rigid support for the tap reconditioning apparatus hereinafter described in detail.

On the upper surface of this base 10 an electric motor 11, which is only partially shown, is provided to drive a grinding wheel 12 in the usual manner.

As may be clearly seen in the figures a simple, convenient and accurate device is provided for dressing the surface of the grinding or abrasive wheel 12. This device comprises an arm 13 outwardly directed from an integral collar 14 thereof which is mounted on the reduced portion of the grinding wheel spindle housing 15 and positioned thereat by means of the thumb screw 16 which threadably passes through collar 14 to engage the spindle housing. As may be seen in Figure 1, this arm 13 is of considerable width and at the upper end in each corner thereof provides for mounting posts 17. These posts extend outwardly in a direction toward the right of the apparatus substantially normal to the arm 13 and in spaced relation to each other. On the rear pin 17, the grinding wheel housing 9 is supported between arms 18 and 19. The front pin 17 extends only through arms 18 and 19 and at the foremost end of arms 18 and 19 a nut 20 is pivotally supported substantially centrally therebetween by means of the sharply pointed studs 21 which are threadably received by arms 18 and 19 and locked in position by means of lock nuts 22 in such manner that their sharpened ends enter tapered openings provided on diametrically opposite sides of the nut 20.

These arms 18 and 19 extend outwardly in overlying relationship to a second pair of arms 23 and 24 formed integral with the grinding wheel housing 9 on the forward face thereof. Between these arms there is positioned another nut 25 which is held by means of studs 26 which are threaded into arms 23 and 24 and locked in position by means of lock nut 27 to maintain nut 25 substantially centrally between such arms.

The nuts 20 and 25 are adapted to threadably receive the hand feed screw 28 which has graduations at 29 immediately below the knob thereof, which are read by means of the indicating pointer 30 secured to the rear portion of nut 20 to register the feed of the dresser toward the grinding wheel 12. As will hereinafter become more clear, feed screw 28 functions to move the grinding wheel housing 9 arcuately about the rear pin 17 to bring the grinding wheel dresser 31 into contact with the grinding wheel 12.

This wheel dresser is mounted in the lower end of a member 32 which is rotatably mounted in a boss formed therefor in the upper end of the grinding wheel housing 9. Member 32 has a shaft portion 33 adapted to extend through an opening provided therefor in such boss portion of the grinding wheel housing 9 and thereat receives the enlarged formed end of lever 34 by means of which it is possible to rotate such member 32.

Thus, it may be seen that by means of the hand screw 28 it is possible to effect arcuate movement of the grinding wheel housing 9 and therewith the wheel dresser 31 about the rear pivot 17 to bring such wheel dresser into contact with the griding wheel 12 after which it is possible by means of lever 34 to provide a radius on the grinding wheel 12 of a curvature approximating the curvature of the flute it is desired to produce on the tap to be ground. When the radius dresser 31 is brought into engagement with the grinding wheel 12, it will be obvious that the spring 35 will effectively urge the same to contact such grinding wheel throughout the dressing operation. After dressing the griding wheel 12, feed screw 28 may be used to retract the wheel dresser 31.

In order to mount a sharpeneing head 36 on the present machine, there is slidably mounted upon a housing 37 immediately below the grinding wheel 12 a reciprocable table 38. This housing 37 is rotably supported by means of a shaft 39 anchored to a bracket 40, which bracket in turn is anchored to the side of base 10. Such housing 37, which is preferably formed from a single, integral hollow casting serves to provide for reciprocation of table 38 and angular positioning of said table in the following manner.

At the top of housing 37, and between the side walls thereof, means are provided for supporting race ways 41. A double race way plate 41a is anchored to the bottom of table 38 and such race ways are adapted to receive the balls 42 for slidably mounting table 38 on housing 37.

As will hereinafter become more clear, it is desirable to reciprocate a tap while a flute thereof is being ground by the grinding wheel 12. In order to accomplish such reciprocation, there is provided on the lower surface of table 38 a rack member 43 adapted to mesh a pinion 44 rotatably supported by a shaft 45 journaled for rotation within suitable bearings provided in such housing 37. This shaft 45 has the squared end 46 adapted to receive a wrench or other suitable means for effecting rotation of the same and it will be obvious that when rotation ensues table 38 may be moved first in one direction and then in the other to accomplish the reciprocation thereof.

This movement of table 38 in one direction may be controlled by means of an adjustable stop 47 which is adjustably positioned in a bracket 48 slidably mounted on housing 37 by means of a bolt 49 held in T-slot 50 provided in the outwardly extending end of housing 37. Such stop 47 is designed to be contacted by a bolt 51 threadably positioned in a plate 52 which is anchored to the outer side of table 38. It will be observed that in this manner there is provided a wide range of adjustment, inasmuch as stop 47 may be moved inwardly or outwardly of bracket 48 by adjusting nut 53 and lock nut 54 as well as by slidably shifting bracket 48 after loosening bolt 49. It is also possible to turn bolt 51 inwardly or outwardly of the supporting plate 52 and in this manner accurately adjust the movement of table 38 toward the right.

Means are also provided to stop the movement of table 38 toward the left, and for this purpose a stop 55 is mounted on the lower surface of table 38 at the left end of rack 43. Stop 55 is adapted to engage a stop 56 positioned within an annular holder 57 on the forward face of housing 37. Such stop 56 may be moved inwardly or outwardly of holder 57 by adjusting nut 58 and lock nut 59. Thus, it is possible to install table 38 on housing 37 while stop 56 is entirely within holder 57 after which, such stop may be moved to an upward position where it will contact stop 55.

To feed a tap to the grinding wheel 12 while the same is held in sharpening head 36, table 38 may be arcuately moved about pin 39 into predetermined angular position. For this purpose, a feed screw 60 is journaled for rotation within a rotatably held bearing 61 provided in the lower portion of housing 37. This feed screw 60 is threadably received by the lead nut 62, likewise rotatably mounted in the lower portion of base 10 and, spaced from bearing 61. The feed screw 60 is provided with shoulders 63 and 64 adapted to abut diametrically opposed sides of the bearing 61 and it will be obvious that as feed screw 60 is rotated, to move the same inwardly or outwardly of lead nut 62, shoulders 63 and 64 act to move housing 37 pivotally about pin 39. Such rotation of feed screw 60 may be readily accomplished by means of the hand wheel 65 fixed to the outer end of the same.

Table 38 may be positively locked in this predetermined angular position by means of a lock nut 66. This lock nut is threadably positioned on bolt 67, which is anchored in the side of base 10, and extends through a curved slot 68 provided in housing 37. When table 38 is accurately and precisely positioned by means of the foregoing, lock nut 66 is tightened to hold such table in adjusted position.

Having described the means for effecting reciprocation of sharpening head 36 and the means for raising the same to feed a tap held therein to abrasive wheel 12, this sharpening head is next described. As stated in the foregoing, this sharpening head 36 is mounted on table 38 and provides the support member 69 having an annular opening 70 which is adapted to receive the housing 71, in which a tapering surface 72 is formed at the forward end.

Such housing 71 is adapted to receive collet 73 having radially expanding fingers 73a on each of which a conical surface is formed at 74 to mate the tapering surface 72 of the housing 71. At its opposite end, collet 73 is threadably secured at 75a to a draw bar 75 which extends outwardly and rearwardly therefrom through an opening provided in housing 71. To this outer end of draw bar 75, a knob 76 is fixed for turning the draw bar to shift collet 73 in housing 71, as will become more clear.

The collet 73 receives at its forward end, within annular opening 77, fingers 73a by means of which a tap 79 is secured as collet 73 is drawn into housing 71. This is accomplished by turning knob 76 for shifting collet 73 into housing 71, obviously, causing the fingers 73a to tighten upon the tap 79 as the conical surfaces 74 thereof move into the tapered portion 72 of the housing. To permit this shifting of collet 73 upon rotation of knob 76, there is provided on the forward end of housing 71 a shoulder portion 80 adapted to enter into abutting engagement with support 69. The opposite reduced end of this housing abuts shoulder 81 on knob 76.

Between shoulder 81 and the back of support 69, a collar 82 and an index plate 83 are mounted on this reduced portion of housing 71 in such manner the index plate contacts the back of housing 71 and support 69. Collar 82 is threaded and engages threads provided on such reduced portion of housing 71 and may be tightened to forcibly urge index plate 83 against housing 71 and support 69. In this way, housing 71 is secured within support 69 and as draw bar 75 is rotated by means of knob 76, shifting of collet 73 results because of the threaded connection 75a between the collet 73 and draw bar 75.

The index plate 83 is notched to correspond with the number of flutes on tap 79 and such notches receive the indexing finger 84 as the same is urged therein by a pin 85, which is positioned in bore 86 in support 69 to be urged outwardly by spring 87. It will be observed that this index plate has a pin 88 extending therethrough and into the back of housing 71, therefore, when it is desired to rotate collet 73 for indexing tap 79 to the next flute, index finger 84 may be moved out of the notch in which it is currently disposed, after which, collet 73 may be rotated by means of knob 76 and then index finger 84 allowed to enter the next notch in index plate 83.

Figure 2:
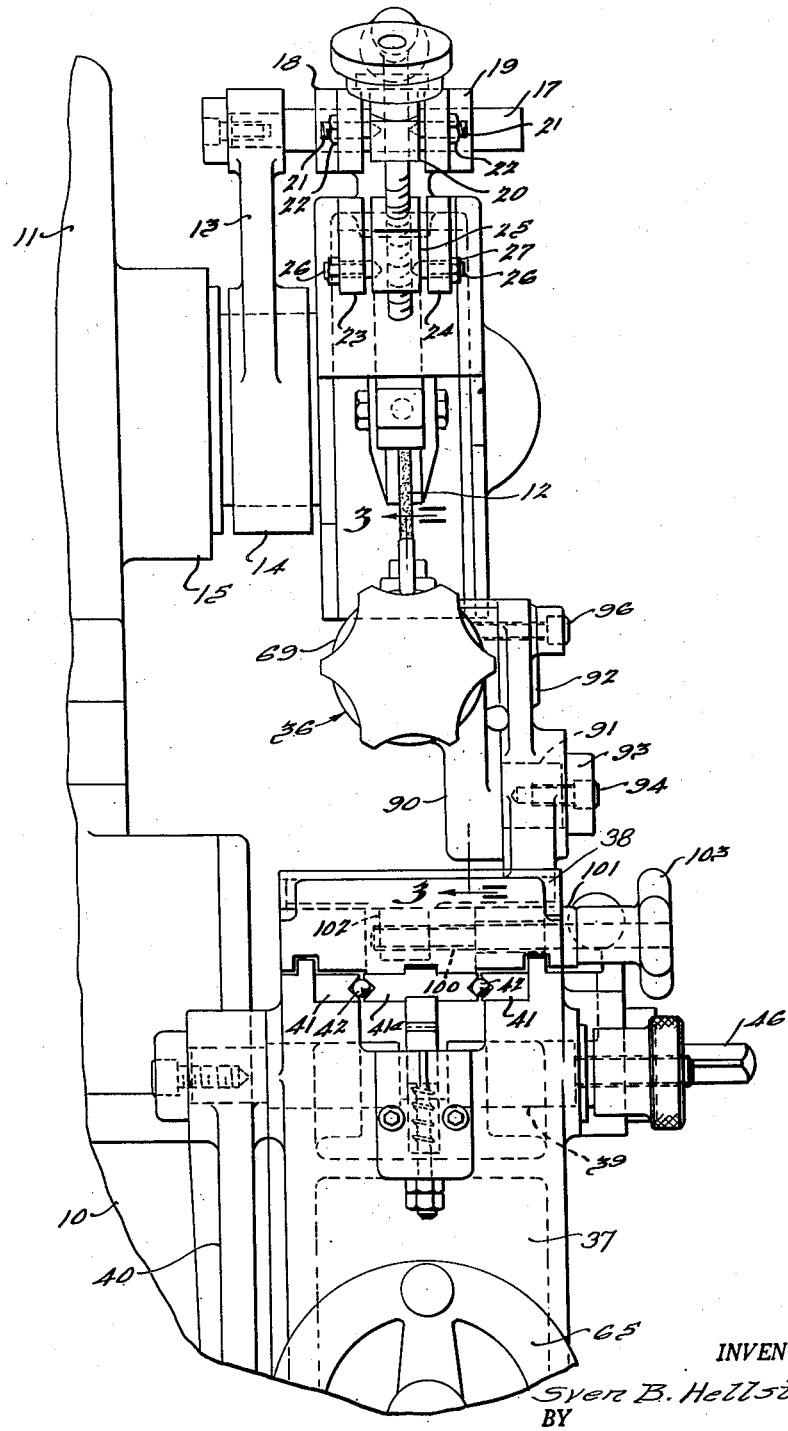
Figure 2 is a broken, partial front elevation of the apparatus of Figure 1.

For reasons to be hereinafter explained, it is desirable to shift the sharpening head transversely of table 38. To accomplish this there is provided on table 38 a cross slide 89 to which such head is fixed. As may be seen in Figure 2, support 69 has a downwardly directed arm or ear 90 integral therewith which has a shaft 91 formed thereon in such manner that the plane of the longitudinal axis of the shaft 91 is substantially normal to the longitudinal axis of the support 69. Shaft 91 is adapted to be disposed within an opening provided therefor in the upwardly directed arm 92 of cross slide 89 and is retained therein by a cap 93. This cap is secured to shaft 91 by means of a bolt 94 extending through said cap 93 to threadably engage the shaft 91. In this manner, sharpening head 36 is anchored to cross slide 89.

Arm 92 provides the arcuately curved slot 95 through which a bolt 96 is permitted to extend to be threaded into support 69 near the top thereof. When it is desired to move sharpening head 36 so the longitudinal axis of the tap 79 is angularly disposed with respect to the plane of reciprocation of table 38, the same may be easily accomplished upon loosening bolt 96. Sharpening head 36 may then be rotated about shaft 91 to the desired angle, after which, the head 36 may be rigidly and positively locked in such angular adjustment by retightening bolt 96. In this manner, it is possible to position tap 79 for grinding the required angle of spiral point thereon.

In order to provide for lateral shifting of cross slide 89, the same is slidably positioned on machined surface 97 of table 38 by means of gibs 98 and 99. Shifting of slide 89 is accomplished by means of a feed screw 100 which is journaled for rotation in the bearing 101 provided by table 38. A lead nut 102 depending from the bottom of slide 88 is threadably received upon such feed screw 100 and, it will be obvious that as such feed screw is rotated, the lead nut will move along the same accomplishing the shifting of slide 89. Such rotation of feed screw 100 may be easily and conveniently accomplished by means of knob 103 fixed to the outer end of this feed screw.

Bearing in mind the above described structure, reconditioning of tap 79 may be accomplished in the following manner. Tap 79 is positioned in sharpening head 36 and it is obvious from the foregoing description that the longitudinal axis thereof will be coincidental to the axis of said sharpening head. Then, with hand wheel 65, table 38 is adjusted arcuately about pin 39 to bring tap 79 into engagement with the periphery of the grinding wheel 12. At that time, such sharpening head is adjusted transversely of table 38, by means of knob 103, to position tap 79 with respect to the plane of rotation of the grinding wheel 12 so that the desired flute contour may be obtained as the grinding operation proceeds. After this, grinding wheel 12 may be driven in the usual manner, and table 38 reciprocated, between the limits permitted by stops 47 and 55, upon applying a wrench or other suitable means to the squared end 46 of shaft 45 for effecting rotation of pinion 44 to drive table 38.

It is pointed out that during this flute grinding operation the longitudinal axis of tap 79 is parallel to the plane of reciprocation of table 38, and for this purpose, of course, sharpening head 36 is in the position illustrated in Figure 1, with bolt 96 at the upper limit of slot 95 of the arm 92. With sharpening head 36 so positioned, the longitudinal axis of tap 79 will be parallel to the plane of reciprocation of table 38 and, although such table is angularly positioned, tap 79 will reciprocate with its longitudinal axis parallel to the plane of reciprocation of table 38 and will engage grinding wheel 12 along a line tangential to a point on the periphery of such wheel.

When one flute of the tap has thus been ground, index finger 84 may be moved out of the slot in which it is currently disposed in index plate 83, allowing the same to be rotated by means of knob 76. This is repeated until all the flutes on the tap are presented to the grinding wheel.

Inasmuch as the degree of spiral point to be ground on the tap will be determined by the degree at which the axis is offset with respect to the plane of rotation of the periphery of the grinding wheel, adjustment of knob 103 will serve to move the tap axially of the grinding wheel to a predetermined position. Then, the sharpening head my be moved about pivot 91 to bring tap 79 into predetermined angular position in accordance to the angle of spiral point desired, after which the same is positively locked thereat by means of bolt 96. Hand wheel 65 is again rotated to bring table 38 upwardly and tap 79 into contact with the periphery of the grinding wheel 12. This brings the portion of the tap to be ground into contact with the grinding wheel 12, after which, the same may be reciprocated tangentially of the grinding wheel 12 in the usual manner by means of reciprocating table 38 within the limits allowed by stops 47 and 55.

As in flute grinding, the tap is indexed as previously described until all flutes have been pointed.

It will also be clear that, during grinding of flutes and spiral pointing, hand wheel 65 is turned from time to time to further raise table 38 in order that the amount of grinding to be done may be increased by this upward feeding of the entire assembly to the grinding wheel.

From the foregoing, it will be obvious that the tap reconditioner of the present invention is of novel and improved design and is suitably rugged and simple in operation so the same may be used by semi-skilled or relatively unskilled labor for reconditioning taps. It will also be clear from the foregoing description that tap reconditioner shown in the drawings and described above has been illustrated in rather specific detail. Obviously, many modifications, changes and departures from the above described construction may be made without departing from the generic spirit and scope of the invention as set forth in the sub-joined claims.

What I claim is:

1. Tap reconditioning apparatus including in combination, a supporting base, a rotatable grinding wheel mounted on said base, means for rotatably driving said grinding wheel about a predetermined axis of rotation, a supporting housing pivotally connected to said base, the pivotal axis of said pivotal connection being parallel to the axis of rotation of said grinding wheel, means for adjustably moving said housing about said pivot, means for locking said housing in predetermined angular position, a table mounted on said housing, said table including means thereon for mounting a tap to be ground, ways interconnecting said table with said housing whereby said table may be reciprocated with respect to said housing, said ways being perpendicular to the axis of said grinding wheel whereby reciprocation of said table will be perpendicular to the axis of rotation of said grinding wheel, and stop means on said housing adapted to engage said table and precisely limit the travel thereof during reciprocation.

2. Tap reconditioning apparatus including in combination, a supporting base, a rotatable grinding wheel mounted on said base, means for rotatably driving said grinding wheel about a predetermined axis of rotation, a supporting housing pivotally connected to said base, the pivotal axis of said pivotal connection being parallel to the axis of rotation of said grinding wheel, means for adjustably moving said housing about said pivot, a table mounted on said housing, said table serving to mount a tap to be ground with its axis lying in a plane perpendicular to the axis of said grinding wheel, ways interconnecting said table and said housing whereby said table may be reciprocated with respect to said housing in a direction perpendicular to the axis of said grinding wheel, stop means on said housing adapted to engage said table and precisely limit the travel thereof during reciprocation, said table including means for adjustably positioning said tap whereby the axis thereof may be parallel to the direction of said reciprocation or substantially inclined thereto.

3. Tap reconditioning apparatus including in combination, a supporting base, a rotatable grinding wheel mounted on said base, means for rotatably driving said grinding wheel about a predetermined axis of rotation, a supporting housing pivotally connected to said base, the pivotal axis of said pivotal connection being parallel to the axis of rotation of said grinding wheel, means for adjustably moving said housing about said pivot, means for locking said housing in predetermined angular position, a table mounted on said housing, said table serving to mount a tap to be ground with its axis lying in a plane perpendicular to the axis of said grinding wheel, ways interconnecting said table and said housing whereby said table may be reciprocated with respect to said housing in a direction perpendicular to the axis of said grinding wheel, stop means on said housing adapted to engage said table and precisely limit the travel thereof during reciprocation, and adjustable means interconnecting said table and said housing whereby said tap to be ground may be bodily moved in a direction generally parallel to the axis of said grinding wheel.

4. Tap reconditioning apparatus including in combination, a supporting base, a rotatable grinding wheel mounted on said base, means for rotatably driving said grinding wheel about a predetermined axis of rotation, a supporting housing pivotally connected to said base, the pivotal axis of said pivotal connection being parallel to the axis of rotation of said grinding wheel, means for adjustably moving said housing about its pivot, means for locking said housing in predetermined angular position, a table mounted on said housing, said table serving to mount a tap to be ground with its axis lying in a plane perpendicular to the axis of said grinding wheel, ways interconnecting said table and said housing whereby said table may be reciprocated with respect to said housing in a direction perpendicular to the axis of said grinding wheel, stop means on said housing adapted to engage said table and precisely limit the travel thereof during reciprocation, said table including means for adjustably positioning said tap whereby the axis thereof may be parallel to the direction of said reciprocation or substantially inclined thereto.

5. Tap reconditioning apparatus including in combination, a supporting base, a rotatable grinding wheel mounted on said base, means for rotatably driving said grinding wheel about a predetermined axis of rotation, a supporting housing pivotally connected to said base, the pivotal axis of said pivotal connection being parallel to the axis of rotation of said grinding wheel, means for adjustably moving said housing about said pivot, means for locking said housing in predetermined angular position, a table mounted on said housing, said table serving to mount a tap to be ground with its axis lying in a plane perpendicular to the axis of said grinding wheel, ways interconnecting said table and said housing whereby said table may be reciprocated with respect to said carriage in a direction perpendicular to the axis of said grinding wheel, stop means on said housing adapted to engage said table and precisely limit the travel thereof during reciprocation, a pivotal connection in said table serving to permit movement of said tap to be ground about an axis parallel to the axis of said grinding wheel, and locking means serving to anchor said table against pivotal movement when in predetermined adjusted position.

SVEN B. HELLSTROM.

REFERENCES CITED

The following references are of record in the file of this patent:

UNITED STATES PATENTS

| Number | Name | Date |
|---|---|---|
| 587,537 | Van Norman | Aug. 3, 1897 |
| 792,685 | Wertzler | June 20, 1905 |
| 1,413,171 | Leavenworth | Apr. 18, 1922 |
| 1,547,566 | Durkee | July 28, 1925 |
| 1,616,727 | Williams | Feb. 8, 1927 |
| 2,118,139 | Bath et al. | May 24, 1938 |
| 2,160,365 | Larsson | May 30, 1939 |
| 2,212,855 | Chittenden | Aug. 27, 1940 |
| 2,213,756 | Zwick | Sept. 3, 1940 |
| 2,257,256 | Herrick et al. | Sept. 20, 1941 |
| 2,332,510 | Franzen | Oct. 26, 1943 |
| 2,393,372 | Hellstrom | Jan. 22, 1946 |
| 2,443,325 | Post | June 15, 1948 |